United States Patent [19]
Grantz et al.

[11] Patent Number: 6,149,161
[45] Date of Patent: Nov. 21, 2000

[54] GROOVED PUMPING SEAL

[75] Inventors: Alan L. Grantz, Aptos; Roger A. Addy, Gilroy; Robert A. Nottingham, Santa Cruz, all of Calif.

[73] Assignee: Seagate Technology LLC, Scotts Valley, Calif.

[21] Appl. No.: 09/060,342

[22] Filed: Apr. 14, 1998

Related U.S. Application Data

[63] Continuation-in-part of application No. 08/994,099, Dec. 19, 1997.
[60] Provisional application No. 60/064,591, Nov. 6, 1997.
[51] Int. Cl.[7] ........................................ F16J 15/40
[52] U.S. Cl. ............................... 277/427; 277/430
[58] Field of Search ........................... 277/427, 428, 277/429, 430; 384/100, 114, 119, 132

[56] References Cited

U.S. PATENT DOCUMENTS

| | | | |
|---|---|---|---|
| 2,526,594 | 10/1950 | Voysey | 384/132 |
| 4,726,693 | 2/1988 | Anderson et al. | 384/114 |
| 5,112,142 | 5/1992 | Titcomb et al. | 384/117 |
| 5,559,651 | 9/1996 | Grantz et al. | 360/99.08 |
| 5,631,761 | 5/1997 | Lee | 359/200 |
| 5,667,309 | 9/1997 | Nose | 384/132 |

*Primary Examiner*—Anthony Knight
*Assistant Examiner*—Karlena D. Schwing
*Attorney, Agent, or Firm*—Flehr Hohbach Test Albritton & Herbert LLP

[57] ABSTRACT

An improved seal for a hydrodynamic bearing which aids in making the bearing less sensitive to changes in load and rotational speed, which is especially useful in hydrodynamic bearing motor in which the bearing is open at both the upper and lower ends. Additionally, a hydrodynamic bearing open at both ends in which the balance of fluid flow or pressure within the total system is maintained, and a seal usable to make a hydrodynamic bearing which is as stiff or stiffer than known standard spindle motors with hydrodynamic bearings which are supported only at one end. Also, a pumping seal useful in a hydrodynamic bearing design to maintain balanced internal fluid pressures during operation to minimize the likelihood of any lubricating fluid being lost during operation is disclosed.

12 Claims, 6 Drawing Sheets

GROOVED PUMPING SEAL

CROSS-REFERENCE TO RELATED APPLICATION

This invention is based on U.S. Provisional Patent Application, Ser. No. 60/064,591, filed Nov. 6, 1997, assigned to the assignee of this application and incorporated herein by reference. This application is a continuation-in-part of U.S. application Ser. No. 08/994,099, filed Dec. 19, 1997, entitled "SIMPLIFIED CONICAL BEARING WITH INDEPENDENT FLOW PATHS", incorporated herein by reference.

FIELD OF THE INVENTION

The present invention relates to disc drive storage systems, and more specifically, the present invention relates to a hydrodynamic fluid bearing for use in a disc drive storage system, and especially a seal useful in such a system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as gas or a liquid provides a bearing surface between a fixed member of the housing and a rotating member of the disc hub. Typical lubricants include oil or ferromagnetic fluids. Hydrodynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repeat runout.

However, some hydrodynamic bearing designs themselves suffer from disadvantages, including a low stiffness-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, hydrodynamic motor designs provide no method for top cover attachment. The reason for this is that in order to have top cover attachment, the motor (i.e. the fluid bearing which separates the fixed and moving parts) would need to be opened on both ends. Opening a motor at both ends greatly increases the risk of oil leakage out of the hydrodynamic bearing. This leakage among other things is caused by small differences in net flow rate created by differing pumping pressures in the bearing. If all of the flows and pressures within the bearing are not carefully balanced, a net pressure rise toward one or both ends may force fluid out through the capillary seal. Balancing the flow rates and pressures in conventional, known fluid bearing designs is difficult because the flow rates created by the pumping grooves are a function of the gaps defined in the hydrodynamic bearing, and the gaps, in turn, are a function of parts tolerances. Thus, a need exists for a new approach to the design of seals for the open ends of a hydrodynamic bearing based motor.

A related problem is maintaining the stiffness of the motor. Because of the lack of mechanical contact between shaft and sleeve, means must be devised for optimizing motor stiffness by maintaining the hydrodynamic bearing gap filled with fluid even after years of operation.

It is also desirable to design a hydrodynamic bearing which is open at both ends for other purposes than fixing both ends of the shaft to the base and cover of a housing. For example, with such an open-ended design, either end (or both) could be extended beyond the sleeve to be coupled to a driver or load, or for other purposes. Under these circumstances also it is important to maintain the fluid in the bearing.

SUMMARY OF THE INVENTION

Thus, it is an object of the present invention to create an improved seal for a hydrodynamic bearing; more particularly, the objective is to provide a seal which aids in making the bearing less sensitive to changes in load and rotational speed.

Another objective is to maintain the fluid in the hydrodynamic bearing gap by providing an adjacent seal with substantial sealing stiffness, wherein the term sealing stiffness represents the ability of the seal to retain the fluid within the gap of the adjacent hydrodynamic bearing.

Yet another objective of the present invention is to provide a seal which is especially useful in hydrodynamic bearing motor in which the bearing is open at both the upper and lower ends.

A related objective of the invention is to provide a hydrodynamic bearing open at both ends in which the balance of fluid flow or pressure within the hydrodynamic bearing system is maintained.

Another objective of the invention is to provide a seal usable to establish substantial sealing pressure adjacent a hydrodynamic bearing to maintain bearing fluid therein.

Another objective is to provide a pumping seal useful in a hydrodynamic bearing design to maintain balanced internal fluid pressures during operation to minimize the likelihood of any lubricating fluid being lost during operation.

These and other objectives of the present invention are achieved by providing a grooved pumping seal which is a capillary seal which employs active pumping to enhance its stiffness. The seal, which is typically incorporated in a hydrodynamic bearing to enhance the stiffness of a fluid dynamic bearing motor, especially of the type which is open at both ends as with top cover attached type motors, comprises a sleeve which surrounds a shaft, typically adjacent to a conical or spherical bearing. Preferably, the sleeve portion of the grooved pumping seal lies between the cone or sphere of the bearing and the central shaft portion of the motor, and surrounds the shaft to be separated from the shaft by a very narrow gap. Considering an axial section of the seal sleeve, it comprises two regions; the first region, which is further axially displaced from the bearing sphere or cone, comprises deep grooves (which may be on the order of approximately 0.04 mm or less, and preferably 0.01 to 0.02 mm) which retain the oil of the grooved pumping seal when the sleeve is not rotating, and which pump the oil when the sleeve is rotating. The other region, termed a quiet zone, and is closer to the cone or sphere, typically has no grooves and thus no pumping occurs. However, with rotation of the sleeve, the pumping of the grooves in the first region forces oil up into the quiet zone, which retains the oil in the narrow gap between this quiet zone of the sleeve and a similarly ungrooved section of the shaft. Because no grooves are in this region, some oil remains in this region during operation, establishing a high pressure region adjacent the fluid bearing. Thus fluid cannot escape the fluid bearing gap of the adjacent hydrodynamic bearing, further, if fluid is lost due to evaporation, thermal effect or the like, it is replaced. This minimizes the ingestion of air bubbles and variations in oil surface wetting in the fluid bearing. The ratio of quiet or non-grooved length to grooved length is typically on the order of 1 to 3 (25% of total length).

In a preferred embodiment, one of the grooved pumping seals is used adjacent the cone, conical or spherical bearing at either end of the shaft, located on the side of the bearing closer to the center of the shaft. Because of the capillary, oil retention grooved features of the first section of the seal, this grooved pumping seal could also be used on the distal side of the cone or sphere i.e. between the fluid dynamic bearing and the open end of the shaft to further minimize fluid loss at each open end of the shaft.

Other features and advantages of the present invention will become apparent to a person of skill in the art who studies the present invention disclosure given with respect to the following figures.

DETAILED DESCRIPTION OF A PREFERRED EMBODIMENT

Figure 1:
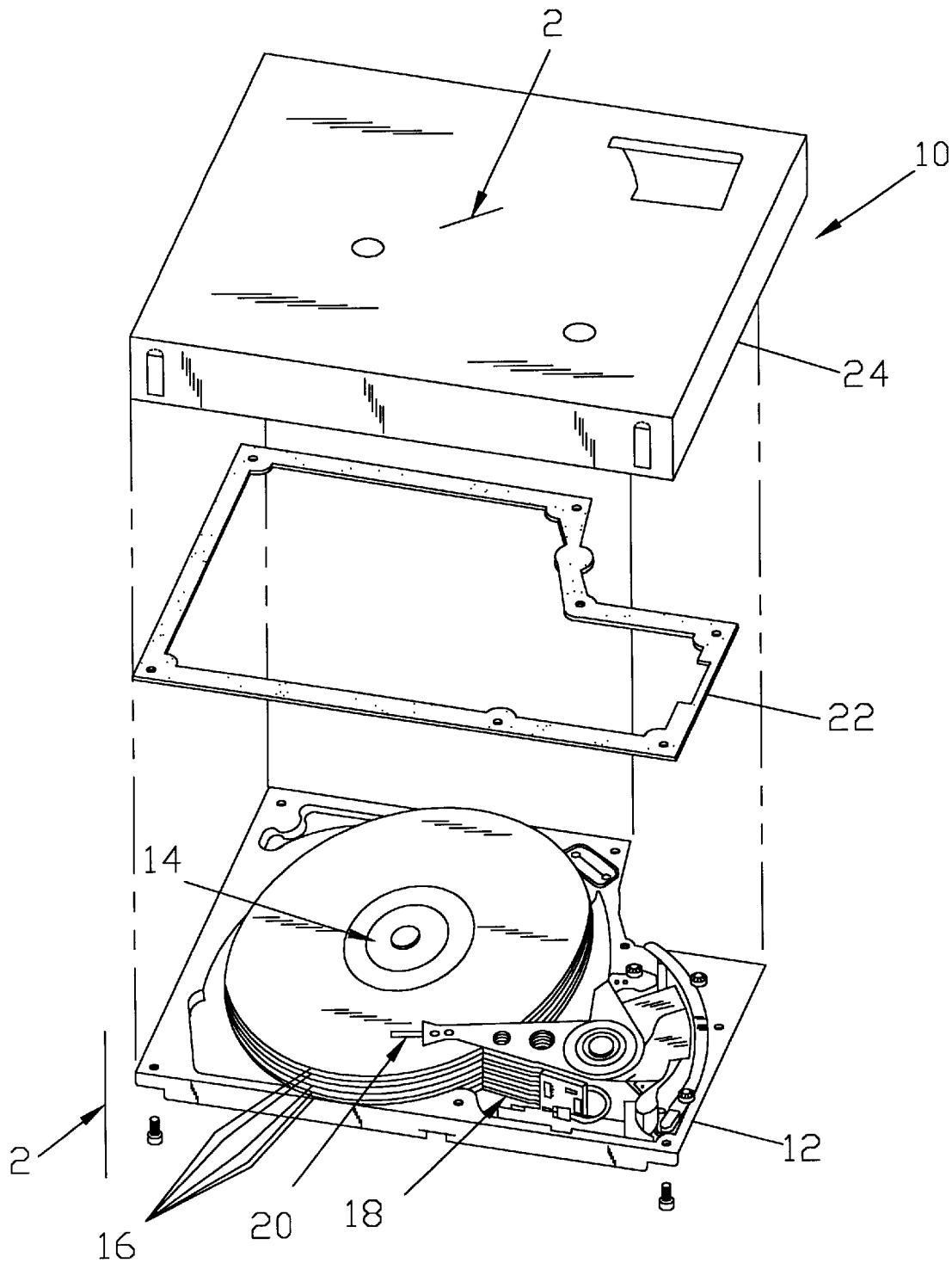
FIG. 1 is an exploded perspective view of a disc drive in which the present invention is useful.

FIG. 1 is an exploded perspective view of a magnetic disc drive storage system in which the present invention could be used. In the example to be discussed below, the use of the grooved pumping seal in a hydrodynamic bearing and associated cartridge will be shown in conjunction with a spindle motor in a disc drive. Clearly, this bearing and seal design is not limited to use with this particular design of a disc drive or motor, which are shown only for purposes of the example. Given the benefits which this invention achieves, the seal could also potentially be used in most hydrodynamic bearings to add seal stiffness and prevent fluid loss, whether the bearing is open at one or both ends. Further, although these examples show a fixed shaft and rotating sleeve or hub, the concepts are equally useful for a rotating shaft/fixed sleeve design, or where both parts rotate relative to one another.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble, which means that the stiffness of the shaft relative to the sleeve and hub must be maintained. Thus maintenance of the fluid in the fluid bearing is essential to the life of the system.

The present invention will next be described with respect to the following figures. This application will disclose in detail an overall motor design which incorporates the grooved pumping seal of this invention.

Overall, the design for the present in-hub spindle motor resulted from the need to incorporate fluid dynamic bearings (FDB) in a spindle motor, utilizing an in-hub configuration, without compromising the electromagnetic efficiency of the motor. By splitting the bearings into two mirror images which are at or close to opposite ends of the shaft, little or no more bearing space is utilized than in a ball bearing motor, allowing the achievement of a in-hub design with a relatively small cross-section.

More conventional FDB motors utilize a journal bearing and a thrust plate to react to radial and axial forces. The journal bearing utilizes a significant amount of volume along the central portion of the shaft of the motor, detracting from the space available for electromagnetics, and compromising the size of the in-hub configuration desired. By utilizing separate FDB's, at each end of the shaft as disclosed herein, which in a preferred embodiment are mirror images of each other although modifications of one may be utilized for various operational or design efficiencies, then no more space is used than the ball bearings that these FDB's replace. The motor is built-up from the stator-shaft assembly outward. The motor bearings are filled with oil either with pressure activated seals (which may be easily incorporated into the present design) or through capillary action.

The seal between the central portion of the shaft and the FDB is provided by a grooved pumping seal as taught herein.

The sealing at the distal ends of the shaft, both of which are opened so that both ends of the shaft may be fixed, is accomplished either with a pair of centrifugal capillary seals and groove pumping seals, or with one of a centrifugal or capillary seal.

Figure 2A:
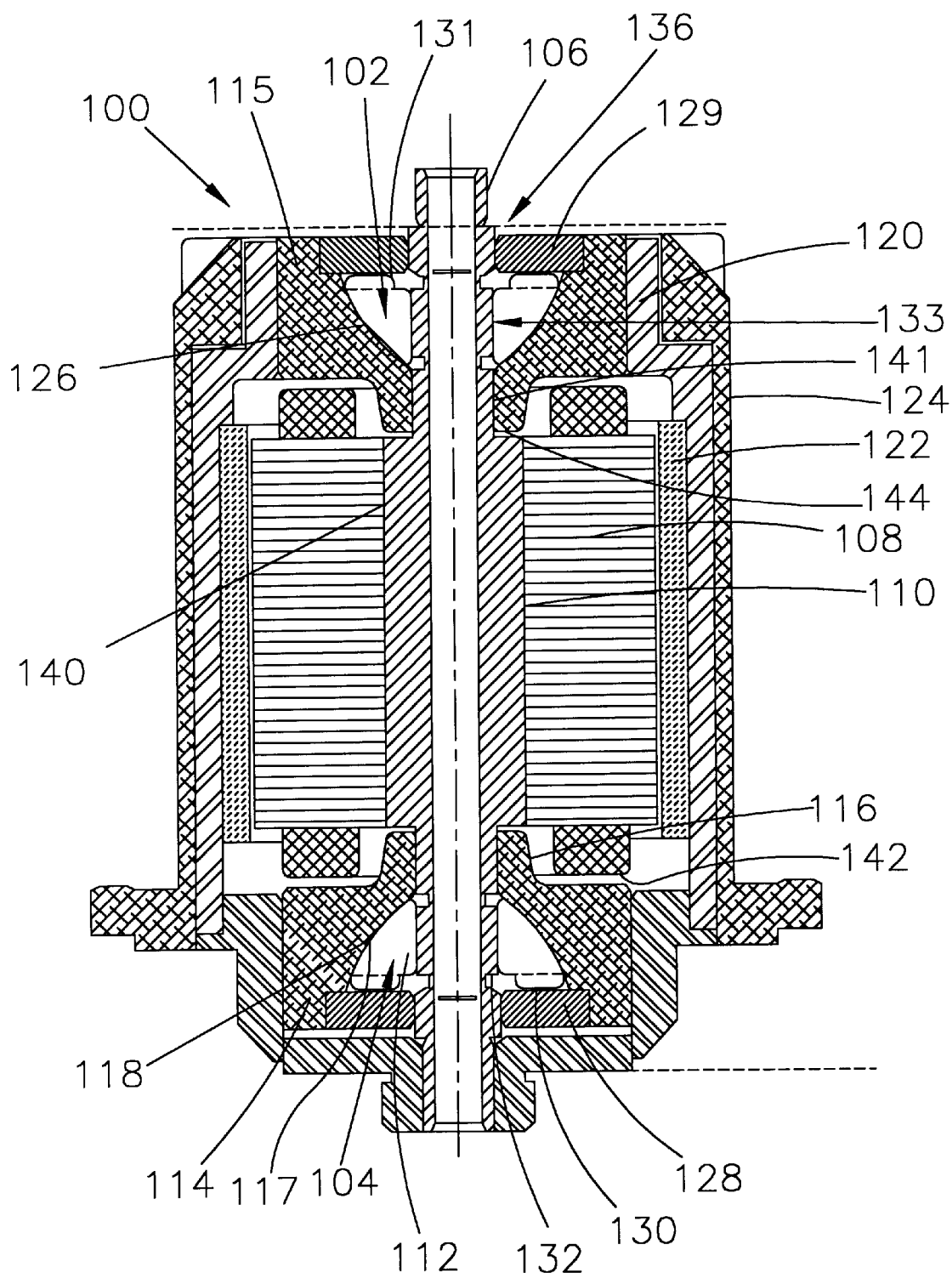
FIG. 2A is a vertical sectional view of a hydrodynamic bearing incorporated in a spindle motor and further incorporating the grooved pumping seal of the present invention.

Referring to FIG. 2A, the figure shows an exemplary in-hub spindle motor with a split fluid dynamic bearing arrangement with two totally separate fluid dynamic bearings 102, 104 mounted at or near opposite ends of a shaft 106 and on opposite sides of a stator 108 mounted on the external surface of the central section of the shaft 110 intermediate to fluid dynamic bearings. Preferably, the fluid dynamic bearings 102, 104 are mirror images of each other. Each comprises (referring to one of the bearings), a bearing cone 112 which is preferably press fit on an external surface of the end section of the shaft 106 and a bearing seat 114 having a section 116 which is integral with or mounted to a section of the bearing seat between the bearing cone 112 and the central section 110 of the shaft, and surrounds the shaft. The bearing cone 112 and seat 114 include complementary surfaces 117, 118 respectively, which together define at least a portion of the fluid dynamic bearing gaps. As the upper and lower bearing seats 114, 115 which support the back iron 120, magnet 122 and hub 124 rotate outside the shaft 106 and the stator 108 of the motor, fluid is maintained in the gap 126 between the bearing cone 112 and the seat 114 to establish a bearing means for allowing this free rotation. The fluid is intended to circulate and be maintained in gaps defined around all three sides of each of the cones 102, 104. Therefore, each bearing seat 115, 114 supports at its axially distal end from the center of the shaft a sealing plate 128, 129, respectively, which is spaced from a surface of the bearing cone 102, 104 to establish a fluid gap 130, 131. Fluid pathways 132, 133 are also provided between the radially inner surface of each cone 102, 104 and the surface of the shaft 106; these gaps are kept filled with fluid, and communicate at either end with the bearing gap and thrust plate gap. These fluid pathways 132, 133 may be formed on either the outside of the shaft or the inside of the cone. Thus a complete fluid path is established around all three sides of each bearing cone.

One of the complementary surfaces 117, 118 of each bearing cone and complementary bearing seat has grooves so that proper fluid pressures are established and circulation is established and maintained through the entire circulation path described so that the bearing seats 114, 115, magnet 122, back iron 120 and hub 124 all rotate freely around the shaft with energization of the stator 108. To prevent fluid from escaping from the fluid dynamic bearing either into the interior region of the drive enclosure, (the atmosphere surrounding the motor), a capillary seal 136 is provided at each open, distal end of the shaft beyond each fluid dynamic bearing. Referring, for example, to the fluid dynamic bearing 104, a capillary seal 136 is established at the open end of the FDB by providing relatively diverging walls between the shaft 106 and the seal plate 129. This diverging wall capillary seal construction is well known in this technology and need not be explained further. Other types of seals at shaft end may also be used to prevent escape of any fluid.

Figure 2B:
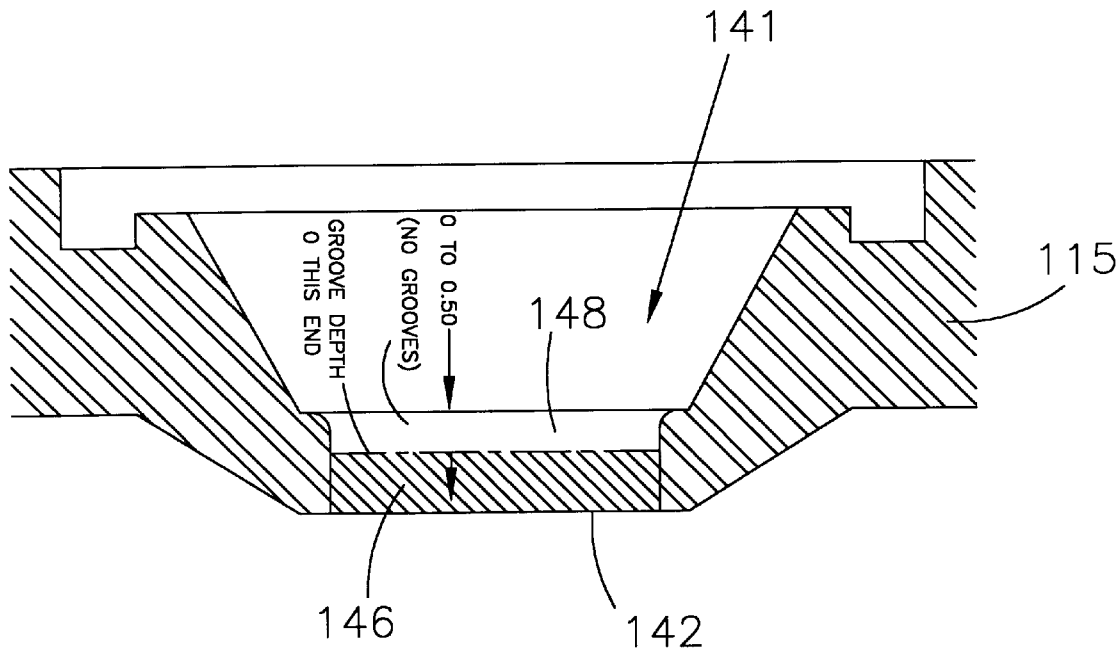
FIG. 2B is a vertical sectional view of a bearing seat and bearing sleeve of the grooved pumping seal of the present invention.

On the opposite side, between the bearing 102, and the central portion 110 of the shaft, a grooved pumping seal 141 is provided, supported from or integrated with the bearing seat 115. This grooved pumping seal, comprises a sleeve section 142 which surrounds the shaft and is separated therefrom by a very narrow gap (for example, on the order of about 0.013 mm). As seen in FIG. 2B, this sleeve 142 is supported from the bearing seat 115 which rotates with the seal plate 129 and hub 124. The sleeve 142 includes two regions; a first region 146 comprises grooves, i.e. relatively deep (for example about 0.01 mm) substantially radial grooves over the majority of their length (as shown in FIG. 2B) which hold the bearing fluid when the sleeve is motionless, and pump the bearing fluid toward the adjacent hydrodynamic bearing when there is relative motion between the sleeve and shaft. The sleeve 142 further includes a second region, a quiet zone 148 which is provided at the one end of the bearing closest to the active section of the hydrodynamic bearing. No pumping occurs in this quiet zone 148. This allows oil to remain in this second region during operation, and minimizes the ingestion of air bubbles, and variations in oil surface wetting. Establishing this sealing pressure adjacent the FDB also prevents the escape of oil from the gap forming the hydrodynamic bearing. The ratio of the quiet, non-grooved regions length to the length along the shaft of the grooved region 142 is preferably 1 to 3 (25% of total length). In a preferred embodiment, the groove has the following parameters: a groove angle of 25°; a groove-to-land ratio of 1:1; twenty-eight equally spaced grooves are provided, with a groove depth varying from 0.01 mm at the distal end to 0 mm at the quiet zone (high pressure end) 148. The characteristics of the pumping of the groove may be altered by changing the depth of the grooves in the region 146 or the spacing of the grooves in this region.

Sealing the interior of the in-hub motor with this grooved pumping seal minimizes fluid loss from the hydrodynamic bearing. That is, as fluid is pumped toward the quiet zone, a pressure differential toward the adjacent hydrodynamic bearing is created. According to one mathematical model (utilizing CADENSE computer code) the pressure, or sealing stiffness is 145000 Pa/mm at 7200 rpm.

This high pressure makes loss of fluid from the adjacent hydrodynamic bearing very unlikely. The quiet zone establishes a region where oil remains in the gap between sleeve 142 and shaft 106. This minimizes the possibility of ingestion of air by the grooves in region 146. In some embodiments it may be desirable to minimize or eliminate the quiet zone 148. Alternatively, the depth of the grooves (or their spacing) could be constant, rather than tapering off toward the quiet zone.

Figure 3A:
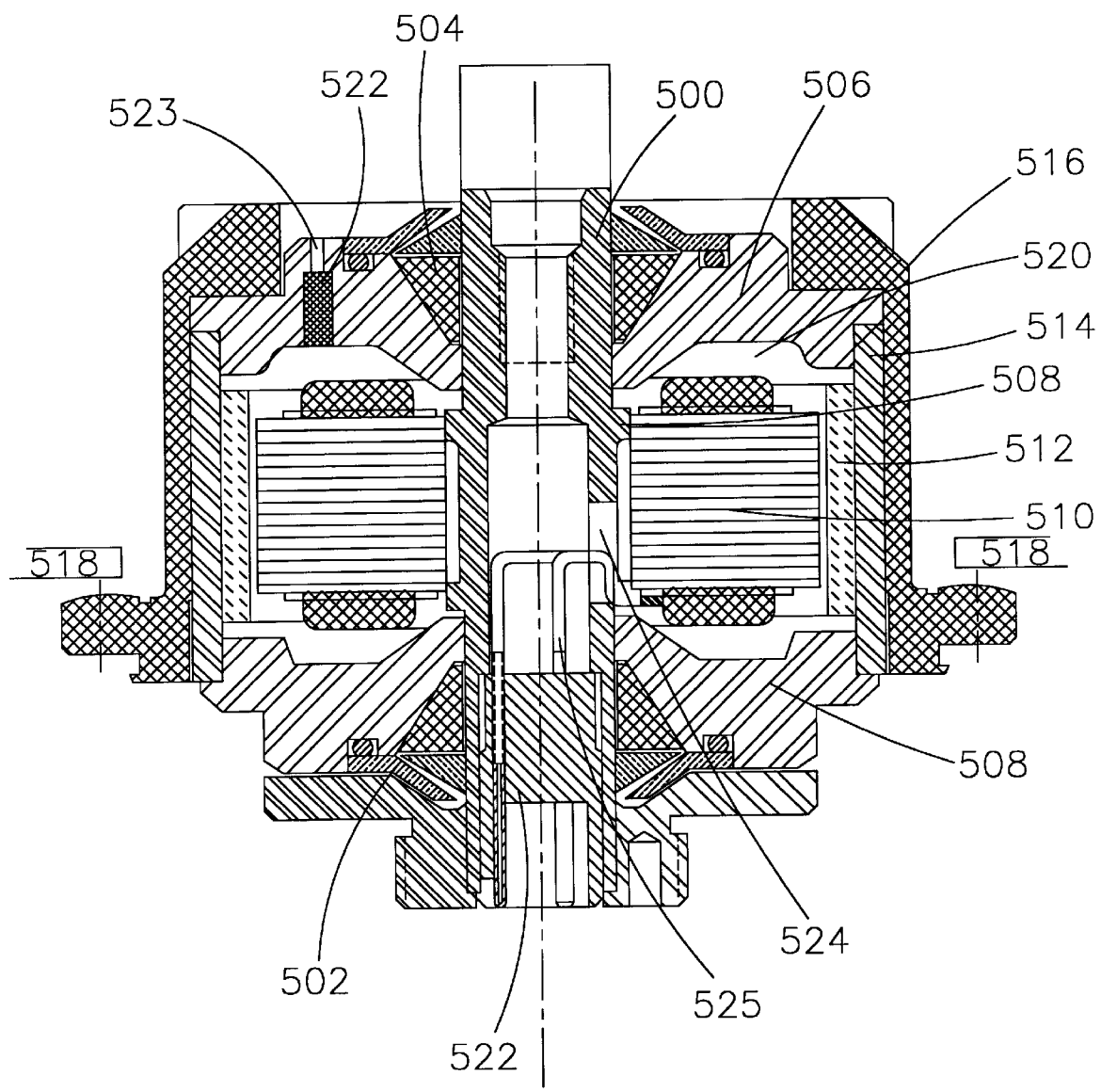
FIGS. 3A and 3B are vertical sectional views of a motor incorporating the grooved pumping seal of the present invention shown in conjunction with a spindle motor in which the invention is useful.
Figure 3B:
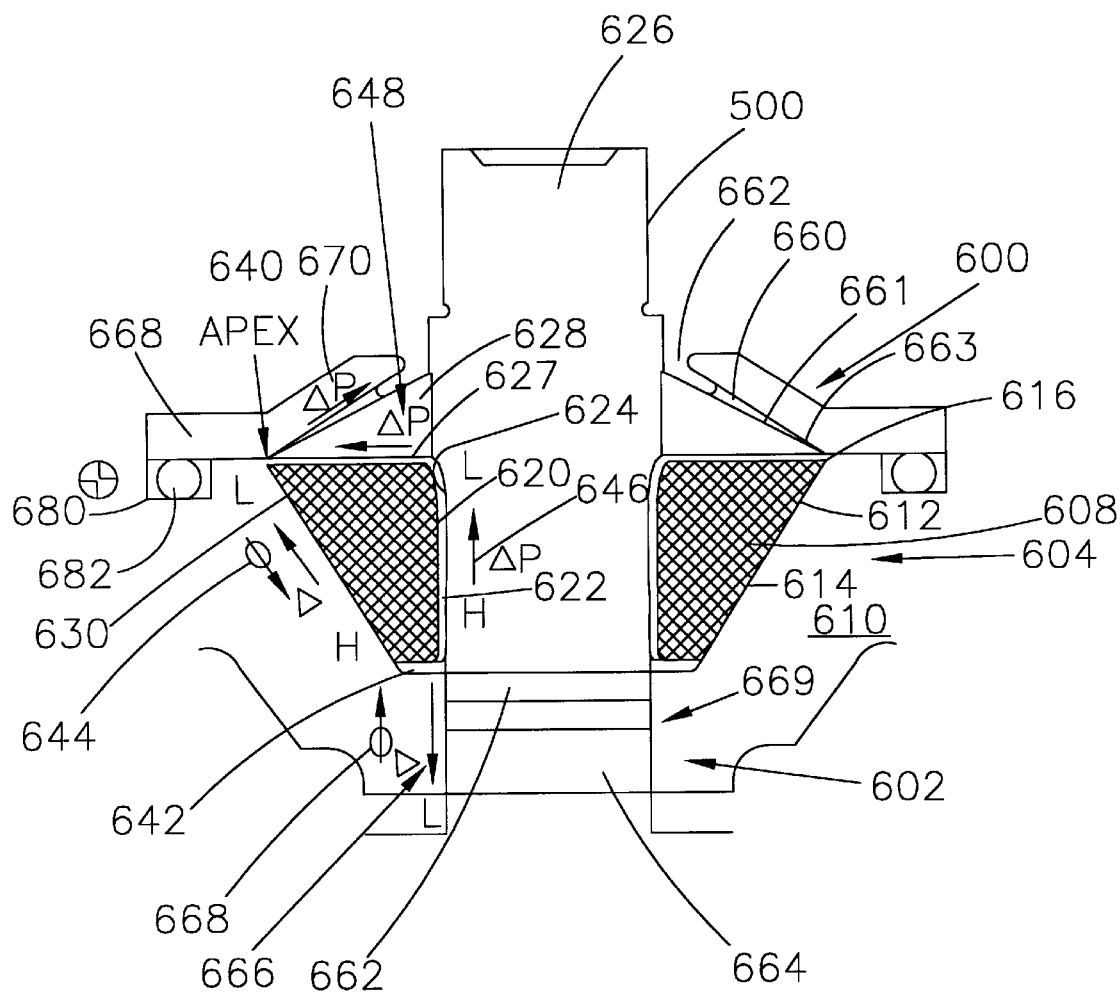

Considering next the embodiment of FIGS. 3A and 3B, a fixed shaft 500 supports grooved, spherical or conical bearings 502, 504 near the opposite ends of the shaft. The central section 508 of the shaft directly supports a stator 510 which cooperates with a magnet 512. The stator mounting, with its inner dimension generally aligned between the FDBs, provides a narrow profile for this in-hub motor. The magnet 512 is supported from a back iron 514 on the interior surface of hub 516 so that energization of the stator 510 causes rotation of the hub and the disc or discs 518 supported thereon. It can be seen that the bearing seats 506, 508 extend radially from the shaft out beyond the outer radial dimension of the shaft supported stator 510 and support the back iron 514 and the hub 516. This defines an enclosed space 520 for the stator and magnet, enclosing a possible source of contaminants. A pressure equalizing filter 522 is incorporated into at least one of the bearing seats 506. The filter extends at least part way through an opening 523 which extends entirely through the bearing seat 506 so that no contaminants generated within space 520 can escape. The stator itself is connected to the necessary control wires 525 to energize the stator windings through a multi-pin plug connector 522, the wires extend through a slot 524 in a wall of the shaft 500 to be connected to the stator windings 510.

As with the previous embodiment of an in-hub spindle motor, this motor also is open at both ends, presenting the problem of easily filling the fluid dynamic bearings 502, 504 with bearing fluid, and thereafter preventing the escape of any such fluid either into the atmosphere or into the interior of the motor. The motor of FIG. 3A incorporates two totally separate fluid dynamic bearings on either side of a stator 510, with no fluid flow or hydrodynamic bearing gap along the central section 508 of the shaft, the FDB's being mounted on either side of this central section. Details of each of the bearings and the general theory of their operation will next be explained with respect to FIG. 3B. Further details and alternative approaches to these designs, which may be incorporated in the present motor, can be found in the following applications all of which are filed contemporaneously herewith and incorporated herein by reference:

Attorney's Docket A-65484, entitled "IN-HUB SPINDLE MOTOR WITH SEPARATE FLUID DYNAMIC BEARINGS," by Grantz, et al.;

Attorney's Docket A-65481, entitled "CENTRIFUGAL CAPILLARY SEAL," by Grantz, et al.; and Attorney's Docket A-65483, entitled "ASYMMETRIC SEALING MEANS," by Grantz, et al.; all of which are assigned to the assignee of the present invention and incorporated herein by reference.

Referring next to FIG. 3B, the sealing design shown in this figure results from the need to provide a very positive sealing means for fluid dynamic bearing motors such as shown in FIGS. 2A and 3A which have two independent fluid dynamic bearings. Of course, the design of FIG. 3B and its alternatives could be used with other motors wherever two independent fluid dynamic bearings are used. The significance of the design, among others, is that it does not require a close balance of pressure between the top and bottom of the bearing. Further, by combining the characteristics of the centrifugal capillary seal generally indicated at 600 (which provides a means for pushing fluid toward the fluid bearing when the motor is spinning and for holding the fluid in the gap when the motor is at rest), and the grooved pumping seal generally indicated at 602 (which provides a means for holding and sealing the fluid in the FDB), together with the conical/spherical bearing generally indicated at 604, the fluid is positively maintained on the surface of the bearing. Each of the seal means also provides means for expelling any air bubbles which may enter the bearing system.

As is already well known, the primary support system is the bearing which comprises the bearing cone 608 and the surrounding bearing seat 610. The cone and seat define facing surfaces 612, 614 which are separated by gap 616 of about five microns (although this dimension is representative of example only; it may be greater or less depending on the tolerances achieved by parts and assembly methods). Fluid fills this gap 616, and is maintained under pressure within this gap by grooves 618 on the surface of the bearing cone 608. To allow for fluid circulation, and maintenance of the fluid in the gap 616, the gap is extended over the back surface 620 of the bearing cone 504 by providing fluid pathways 622 running linearly along the back surface of the cone or the facing surface 624 of the shaft. These pathways 622 allow the fluid to pass axially toward the distal end 626 of the shaft 500. The path or bearing gap for the fluid is completed through a gap between a wall 627 of the sealing cone 628 and the upper surface 630 of the bearing cone 608. Most efficiently, the path is through grooves 632 formed in the top surface 630 of the cone 608, although the grooves could also be provided in the complementary surface of the sealing cone 628.

As is shown by the arrows marked Δp on FIG. 3B, the pumping action of the grooves 618 on the face of the cone creates a pressure differential from the apex 640 of the bearing cone toward the narrower end 642 of the cone. The pressure gradients, indicated by the arrows labeled Δp, are from higher to lower pressure in the direction of the arrow. With the exception of the pumping sections, Δp and flow are in the same direction. Thus, the fluid flow over the surface of the cone being generally from the point of lower to higher pressure, is as marked by the arrow 644 and continues axially toward the distal end 626 of the shaft following the path marked by arrow 646 and returns to the apex of the cone (not shown) following the pressure arrow 648.

In order to provide a means for fluid to be inserted into the fluid dynamic bearing, as well as to provide a means for air bubbles to be expelled from the bearing 610, a centrifugal capillary seal 660 is incorporated into the design, leading from the open end 662 of the fixed shaft 500 and relatively rotating parts, down to the apex 640. Details of this design are found in the incorporated application. Basically, as disclosed, the centrifugal capillary seal 660 operates to continuously purge the FDB of any air which might inadvertently enter the system, while very effectively sealing the fluid within the bearing system.

In order to further enhance the sealing stiffness of the system, a grooved pumping seal 602 is provided, typically and preferably immediately axially inward from base 642 of the bearing cone, between the bearing cone and the central portion of the shaft where the stator is mounted. This grooved pumping seal 602, in a preferred form, can be defined on the face of a central section 669 of the bearing seat 610 which also supports one surface 614 of the fluid dynamic bearing. In a preferred form, this grooved pumping seal comprises an ungrooved surface section or quiet zone 662 surrounding a portion of the ungrooved shaft immediately adjacent the base or narrow section 642 of the bearing cone, and a grooved pumping region 664 which also closely surrounds an ungrooved section of the shaft immediately adjacent the quiet zone 662. This grooved pumping seal 602 is intended to be a low volume, very high stiffness seal. It is a capillary seal which employs active pumping by virtue of the presence of relatively deep grooves in one section 664 of the seal to provide very high seal stiffness. Seal stiffness is defined as the change in pressure developed across the seal divided by the axial length of fluid in the seal or Pa/mm (Psi/inch). As used herein, seal stiffness represents the seal's ability to retain fluid in the adjacent hydrodynamic bearing. When the shaft is at rest, the oil settles into the groove annulus 664 but cannot pass further down the shaft because of the capillary effect of diverging external annulus and the small radial gap between the shaft and rotating sleeve. When the motor spins up, the relative rotation of the shaft 500 and the surrounding section 664 of the grooved pumping seal create the pressure gradient indicated by the arrow Δp, 666. This causes an oil fluid flow out of the grooves into the quiet zone 669 as indicated by the arrow 668. Further, because of this quiet zone, there is no pumping action to force the oil out of the quiet zone of the grooved pumping seal into the fluid dynamic bearing, so that the necessary fluid for effective operation of this grooved pumping seal is maintained.

Any air bubbles which appear in the quiet zone would tend to be captured by the pressure gradients in the fluid dynamic bearing and be expelled from the distal end of the shaft through the centrifugal capillary seal; any further air bubbles which moved into the grooves of the groove section 664 could be expelled into the interior section of the motor because of the strong pressure gradient created by the rotation of the grooved pumping seal.

Finally, it should be noted that the depth of the grooves and/or the width of the grooves diminishes as the oil is moved up through the grooved pumping zones 664 into the quiet zone 669. This enhances and provides a means for pumping the oil efficiently out of the grooves into the quiet zone during motor operation, while providing a strong capillary effect in the grooved region to maintain the oil in the grooved pumping seal 602 when the motor is not in operation.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the shaft could be left entirely smooth, and the grooves instead imposed upon the shaft.

Figure 4:
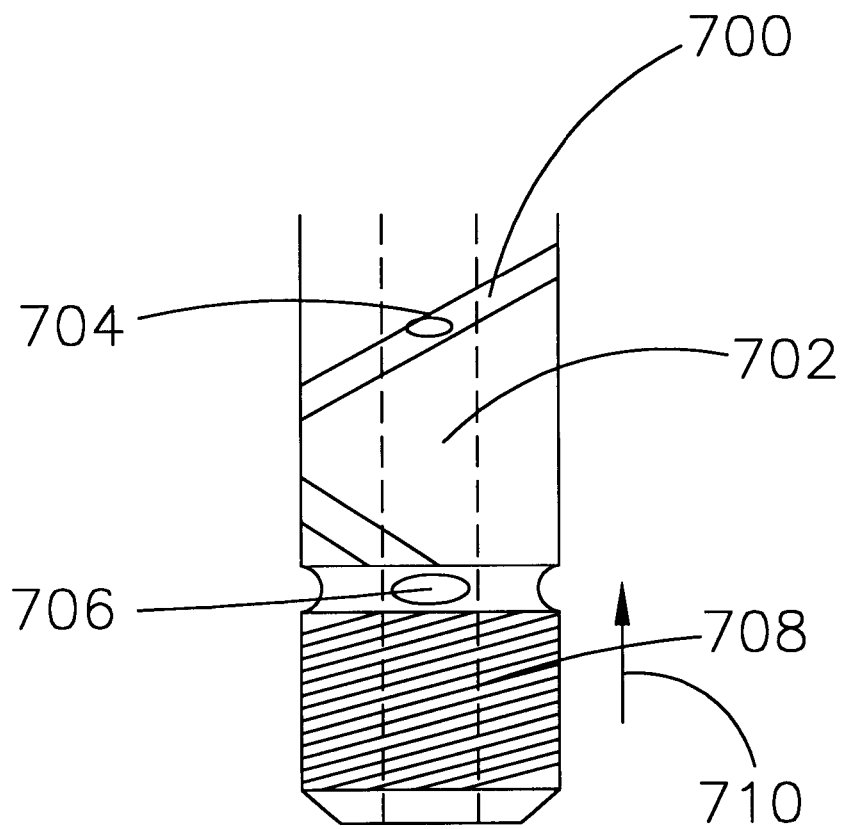
FIG. 4 vertical sectional view of a portion of a journal bearing used in conjunction with the grooved pumping seal of the present invention.

Other alternatives to the present design disclosed herein may be within the skill of the art and apparent to a person who studies this disclosure. For example, grooved pumping seals could be used on either side of each fluid dynamic bearing to seal fluid within the bearing. Further, the grooved pumping seal could be used at the base of a journal bearing as shown in FIG. 4. Such a bearing has a hydrodynamic bearing cartridge comprising a fixed central shaft carrying first and second convex bearing portions separated by a central circular shaft portion. Such bearing has bearing grooves 700 which are generally sinusoidal or conical in shape extending along the surface of the shaft to create pressure gradients along the shaft. In many such embodiments, a central reservoir 702 is provided to provide for a complete fluid circulation path from around the center where a central bore 704 is located to the base of the groove pattern where an exit bore 706 is located. Below the region where the standard grooves are located, according to this embodiment a plurality of fine pitch (screw type) threads 708 are provided. Such fine pitch substantially radially directed grooves can be used to pump fluid in the direction indicated by arrow 710 to prevent any fluid escape from the base of the shaft through the base of the motor and to maintain the fluid over the surface of the shaft.

Other alternatives and applications of the grooved pumping seal of this invention may also appear to a person of skill in the art. Therefore, the scope of the present invention is to be limited only by the following claims.

What is claimed is:

1. A grooved pumping seal especially designed to provide substantial sealing stiffness utilizing active pumping adjacent to a hydrodynamic bearing said seal comprising a shaft and a sleeve mounted for relative rotation, one of said shaft and said sleeve comprising means for storing bearing fluid when said shaft and said sleeve are at rest, adjacent to means for establishing sealing pressure adjacent said bearing when said shaft and said sleeve are relatively rotating to prevent loss of fluid from said bearing.

2. A grooved pumping seal as claimed in claim 1 wherein said shaft is fixed and said sleeve is mounted for rotation relative to said shaft.

3. A grooved pumping seal as claimed in claim 2 wherein said pumping seal comprises first and second adjacent regions on said shaft, said first region being relatively wider in an axial dimension than said second region and comprising said means for storing fluid, said second region comprising said means for establishing sealing stiffness adjacent said hydrodynamic bearing.

4. A grooved pumping seal as claimed in claim 3 wherein said first region comprises closely spaced substantially horizontal spiral grooves capable of retaining said fluid when said sleeve is at rest and for pumping said fluid into said second region when said sleeve and said shaft are relatively rotating.

5. A grooved pumping seal as claimed in claim 4 wherein said second region comprises an ungrooved region of said sleeve closely spaced from said shaft so that fluid between said shaft and said sleeve during relative rotation of said sleeve and said shaft establishes substantial sealing stiffness adjacent said hydrodynamic bearing.

6. A grooved pumping seal as claimed in claim 5 wherein the ratio of the axial length of said first region to the axial length of said second region is about 3 to 1.

7. In a motor for use in a disc drive comprising a shaft and a sleeve around a portion of said shaft, a substantially conical hydrodynamic bearing at each end of said shaft comprising a cone supported from said shaft and a sleeve having a surface facing a surface of said cone, said sleeve further defining a grooved pumping seal comprising first and second adjacent regions on said shaft, said first region comprising a reservoir for storing fluid, said second region comprising means for establishing sealing stiffness adjacent said hydrodynamic bearing and axially adjacent said bearing cone, said grooved pumping seal second region comprising a section of said shaft surrounded by said sleeve having fine pitch pumping grooves circumferentially spaced along at least a section thereof, said grooves having a spacing and pitch to create a pressure gradient toward said bearing cone so that fluid in a bearing gap between said bearing cone and said bearing seat is maintained in said gap.

8. A grooved pumping seal as claimed in claim 7, the first region of the grooved pumping seal being relatively wider than the second region, both said regions being defined along the shaft.

9. A grooved pumping seal as claimed in claim 8 wherein said second region comprises closely spaced substantially horizontal spiral grooves capable of retaining said fluid when said sleeve is at rest and for pumping said fluid into said conical bearing when said sleeve is rotating relative to said shaft.

10. A grooved pumping seal as claimed in claim 8 wherein the ratio of the axial length of said first region to the axial length of said second region is about 1 to 3.

11. A grooved pumping seal as claimed in claim 8 wherein said first region is an ungrooved region closely spaced from said shaft so that fluid between said shaft and said sleeve establishes substantial sealing stiffness closely adjacent said hydrodynamic bearing.

12. A grooved pumping seal as claimed in claim 7 wherein said shaft is fixed and said sleeve is mounted for rotation to said shaft.

* * * * *